Oct. 6, 1959 S. DUINKER 2,907,988

MAGNETIC MEMORY DEVICE

Filed Sept. 28, 1955 2 Sheets-Sheet 1

INVENTOR
SIMON DUINKER
BY [signature]
AGENT

Oct. 6, 1959 S. DUINKER 2,907,988

MAGNETIC MEMORY DEVICE

Filed Sept. 28, 1955 2 Sheets-Sheet 2

INVENTOR
SIMON DUINKER
BY [signature]
AGENT

United States Patent Office 2,907,988

Patented Oct. 6, 1959

2,907,988

MAGNETIC MEMORY DEVICE

Simon Duinker, Eindhoven, Netherlands, assignor, by mesne assignments, to North American Philips Company, Inc., New York, N.Y., a corporation of Delaware Application September 28, 1955, Serial No. 537,185

Claims priority, application Netherlands October 8, 1954

8 Claims. (Cl. 340—174)

This invention relates to magnetic memory devices, and, in particular, to two-dimensional grids for static magnetic trigger units which may be used, in so-called memory matrices in which the static magnetic trigger units are arranged in rows and columns.

In known constructions, the static magnetic trigger units comprise a ring core made from a material having a substantially rectangular magnetisation curve and comprising the required read-in and read-out windings. The polarisation condition of the remanent flux of the core represents information supplied to the trigger unit. This information is supplied to the unit in the form of electric pulses flowing through one or more electric conductors which are coupled to the unit and may either be windings or single wires.

Such ring cores are disadvantageous in that the electric pulses supplied to the conductors coupled to the core require comparatively large powers and the maximal recurrence frequency of said pulses is limited.

A ferromagnetic core for two-dimensional grids of static magnetic trigger units has been proposed, which core consists of a plate made from a material having a substantially rectangular magnetisation curve, said plate being provided with openings and strips left between said openings of which strips those having a comparatively small cross-section serve as active parts of static magnetic trigger units, while strips of comparatively large cross-section left between said openings, together with the edge of the plate, act as yokes for the strips of comparatively small cross-section.

Such a construction has several disadvantages. Firstly, said yokes introduce a considerable reluctance on account of their length; second, the required windings cannot be single wires; and, third, the magnetic circuits of the several triggers are not uniform.

The present invention relates to a construction of this type and has for its object to mitigate its disadvantages.

The ferromagnetic core in accordance with the invention also comprises a plate made from a material having a substantially rectangular magnetisation curve, which plate is provided with openings in such manner that between the openings there are left strips or portions having a comparatively small cross-section as well as strips or portions having a comparatively large cross-section, each strip of comparatively small cross-section being situated between two strips of comparatively large cross-section, and the strips of comparatively small cross-section, which constitute a two-dimensional pattern or array, serving as active parts of static magnetic trigger units, characterized in that, in the vicinity of at least the strips not magnetically short-circuited by edges of said plate and having a small cross-section, the strips of comparatively large cross-section are bridged by a member constituted of a magnetic material of low reluctance.

Figure 1:
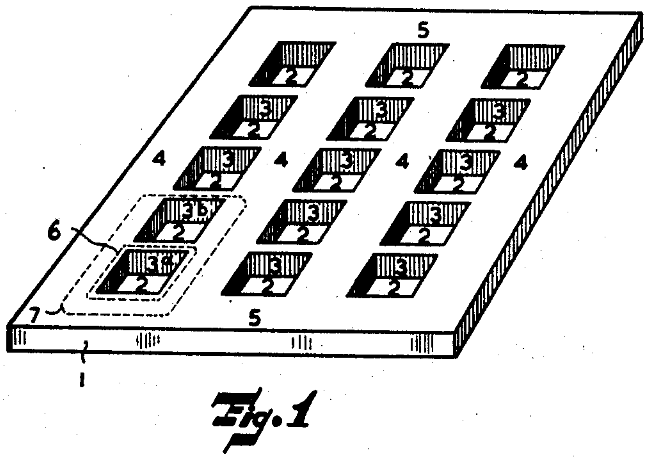
Figure 2:
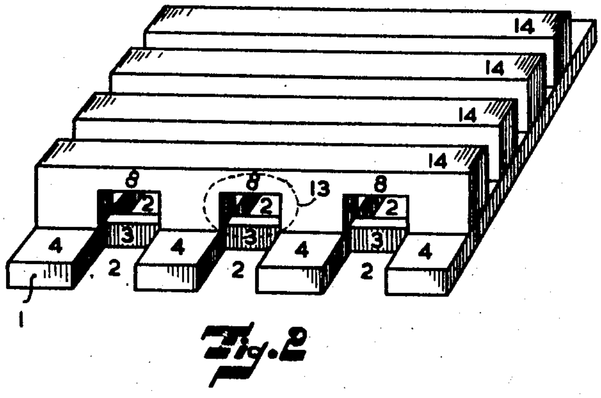
Figure 3:
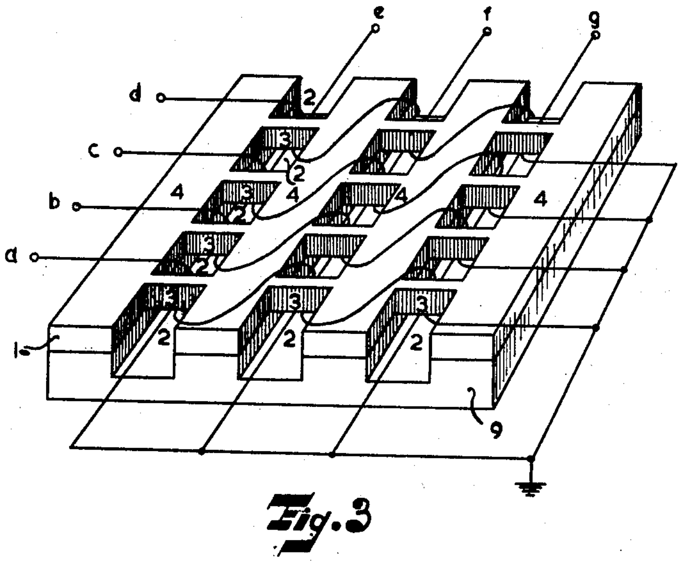
Figure 4:
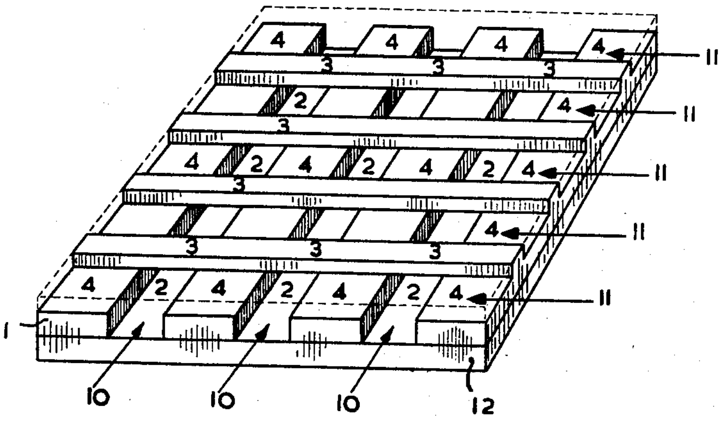

In order that the invention may be readily carried into effect, it will now be described with reference to the accompanying drawings, given by way of example, in which Fig. 1 shows a known construction of a ferromagnetic core for a two-dimensional grid of static magnetic trigger units and Figs. 2, 3 and 4 represent examples of ferromagnetic cores in accordance with the invention.

Fig. 1 shows a ferromagnetic core for a two-dimensional grid of static magnetic trigger units according to said known construction. This core comprises a plate 1 consisting of ferromagnetic material having a substantially rectangular magnetisation curve, which is sometimes referred to as a square loop material. The plate comprises openings 2 which form a row of strips or magnetic portions 3 of comparatively small cross-section and a row of strips or magnetic portions 4 of comparatively large cross-section. The several read-in and read-out windings are provided on the strips 3, which easily become saturated because of their small cross-sectional area. The magnetic circuit of which such a strip forms part is completed via strips 4 of large cross-section and edges 5 also having a large cross-section. Such a closed circuit constitutes the circuit of a static magnetic trigger unit, the active portion of which is substantially constituted only by the strip 3. It will be appreciated that the number of static magnetic trigger units is equal to the number of strips 3 of comparatively small cross-section.

The construction shown in Fig. 1 has the aforesaid limitations. It will readily be appreciated that the yokes of a magnetic circuit, the active part of which is a strip 3, particularly if such a strip is located more inside the plate, introduce a considerable reluctance into the circuit on account of their length, and that it is objectionable to use single wires for the required windings, which, in contradistinction thereto, is possible in memory systems made up of ring cores. Also, the fact that the magnetic circuits of the several static magnetic trigger units are not uniform is evident when considering the magnetic circuits 6 and 7 shown in broken lines, of which the strips of comparatively small cross-section **3*a* and 3*b* form part. It is to be noted that non-uniformity of the magnetic circuits is objectionable because the information read into the several trigger units is not the same, and, on reading-out, gives rise to output voltages which depend on the location of the associated active strip 3 of the trigger unit in plate 1**.

Fig. 2 shows an example of a ferromagnetic core in accordance with the invention. Corresponding parts in Figures 1 and 2 are provided with the same reference numerals. In the proximity of the strips 3, the strips 4 are bridged by a member 8 constituted of magnetic material of low reluctance. The length of said parts 8 need not exceed the minimum length of the yokes of the structure shown in Fig. 1 and, notably for strips 3 located at the centre of plate 1, will be much smaller than in this structure. Moreover, the reluctance of all the magnetic circuits, one of which is shown diagrammatically in broken lines 13, is equal if the parts 8 are uniform. It will further be clear that, in this case, the plate 1 need not be furnished with edges 5. If, however, said edges 5 are present, it is sufficient to bridge the strips 3 which are not magnetically short-circuited by the edges 5 by means of a material of low reluctance. In proportioning the edges 5 and yokes 8, the reluctances of the several yokes should be equal when the magnetic circuits are to be uniform.

In the construction shown in Fig. 2, it is moreover possible to use windings in the form of single conductors in exactly the same manner as in memory matrices made up of ring cores, since here the several magnetic circuits do not surround each other, contrary for example to the circuits 6 and 7 of the construction shown in Fig. 1.

It is pointed out that in the construction shown in Fig. 2, the yokes 8, which serve to complete the magnetic circuits made up of aligned strips 3, form a unitary assembly. The yokes thus combined are denoted by 14 in Fig. 2. Alternatively, all of the yokes may be united to form an assembly. Fig. 3 shows a construction comprising such yokes forming a unitary structure. The reference numeral 1 again designates the plate made from a material having a substantially rectangular magnetisation curve, 2 designates the openings, 3 denotes the strips of comparatively small cross-section and 4 denotes the strips of comparatively large cross-section. The yokes are united to form a common plate 9.

The construction shown in Fig. 3 moreover comprises read-in conductors *a, b, c, d, e, f* and *g* in a manner also customary for memory matrices made up of ring cores. It will be appreciated that the provision of read-out conductors with memory matrices made up of ring-cores is alternatively possible in the usual manner.

In the construction shown in Figs. 2 and 3, the plate 1 and the yokes 8 and the common yoke plate 9 are usually subjected to various grinding operations. Another object of the invention is to provide a construction in which, starting with two flat plates, one of which consists of a material having a substantially rectangular magnetisation curve, the number of grinding operations is minimal.

To this end, the ferromagnetic core has the further feature that, at one side of the plate substantially having a rectangular magnetisation curve, the outer faces of the strips of comparatively large cross-section are located farther outwards than the outer faces of the strips of comparatively small cross-section, and that in the proximity of the strips of comparatively small cross-section, said outer faces of the strips of comparatively large cross-section are bridged by a material of low reluctance.

Fig. 4 shows an example of a ferromagnetic core according to said further feature. The reference numeral 1 again represents the plate having a substantially rectangular magnetisation curve. The broken lines indicate the size and form of the initial plate. The plate 1 with strips 3 and 4 and openings 2 are obtained by simple grinding operations in the directions 10 and 11. After providing the read-in and read-out conductors it is only necessary to secure a flat plate 12, constituted of low reluctance material and which does not need any further processing, to the plate 1 in the manner shown in the drawing.

If, in order to economize material, it is desired to avoid the use of a large common plate 12, such a plate may be divided into several small plates which are secured to the strips 4 of plate 1 in the proximity of the strips 3.

In order to make the whole structure sturdier, it may be embedded in protecting material such as, for example, glass or synthetic resin.

Suitable low reluctance materials for the parts 14, 9 and 12 of Figs. 2, 3 and 4 are, for example, any one of many well-known soft ferromagnetic materials, such as soft iron, and several ferrites. The ferrite materials are electrically non-conductive (see Teletech. 11, 5, May 1952, page 50).

Electrically non-conductive materials are preferred.

Suitable materials exhibiting the high remanence and the rectangular magnetization curve are also well-known, such as materials obtained by producing in a magnetic material, such as nickel iron or a ferrite material, by means of mechanical and thermal operations, such as rolling, pressing and annealing, a determined grain structure with the result that an anisotropic material is obtained which for a definite magnetisation direction exhibits a rectangular polarisation characteristic (see Teletech. 11, 5, May 1952, page 50; P.I.R.E., April 1952, page 475; Electronics, April 1953, page 146).

The electrically non-conductive material is likewise preferred.

What is claimed is:

1. A magnetic memory device comprising a two-dimension-extended member constituted of a magnetic material having a substantially rectangular-shaped magnetization characteristic and having plural apertures in a two-dimensional array defining a plurality of first magnetic portions of small cross-section and a plurality of second magnetic portions of larger cross-section, and a low reluctance magnetic member mounted adjacent each of said first portions and forming with it a magnetic circuit.

2. A magnetic memory device comprising a plate-like member constituted of a magnetic material having a substantially rectangular-shaped magnetization characteristic and having plural apertures in a two-dimensional array defining a plurality of first magnetic portions of small cross-section and a plurality of second magnetic portions of larger cross-section adjoining opposite ends of the first portions, and a low reluctance magnetic member overlying said plate-like member and having portions engaging said second portions but spaced from said first portions to form with the first and second portions discrete magnetic circuits arranged in a two-dimensional array and possessing substantially the same magnetic characteristics.

3. A magnetic memory device comprising a substantially planar plate-like storage member having plural apertures in a two-dimensional array and constituted of a magnetic material having a substantially rectangular-shaped magnetization characteristic and defining a plurality of first magnetic portions of small cross-section forming an array and a plurality of second magnetic portions of larger cross-section adjoining opposite ends of the first portions, a magnetic member mounted on said storage member and having low reluctance portions engaging a plurality of said second portions but spaced from a plurality of said first portions to form with the first and second portions a plurality of discrete magnetic circuits arranged in a two-dimensional array, and windings coupled to said magnetic circuits.

4. A device as set forth in claim 3 wherein the magnetic member having low reluctance portions has an elongated form overlying a plurality of said first portions aligned with one another.

5. A device as set forth in claim 3 wherein the magnetic member having low reluctance portions is a plate-like member overlying all of said first portions.

6. A magnetic memory device comprising an apertured member constituted of a magnetic material having a substantially rectangular-shaped magnetization characteristic and having a plurality of first magnetic portions of small cross-section lying in a first common plane and arranged in a two-dimensional array and a plurality of second magnetic portions of larger cross-section lying in a second common plane spaced from said first plane, and a low reluctance magnetic member mounted on said second magnetic portions and overlying a plurality of said first portions and forming with it and with some of said second portions plural magnetic circuits.

7. A device as set forth in claim 6 wherein the low reluctance member is a plate-like member overlying all of said first portions.

8. A device as set forth in claim 6 wherein windings are coupled to the said first portions.

References Cited in the file of this patent

UNITED STATES PATENTS

| | | |
|---|---|---|
| 2,722,603 | Dimond | Nov. 1, 1955 |
| 2,805,407 | Wallace | Sept. 3, 1957 |

OTHER REFERENCES

"EDVAC Progress Report #2," June 30, 1946, PY-O—165 pages 4-22 4-23 (Fig. 17*c* relied on).